No. 871,461. PATENTED NOV. 19, 1907.
C. P. VAN GUNDY.
WATER PURIFYING APPARATUS.
APPLICATION FILED FEB. 26, 1907.
2 SHEETS—SHEET 1.
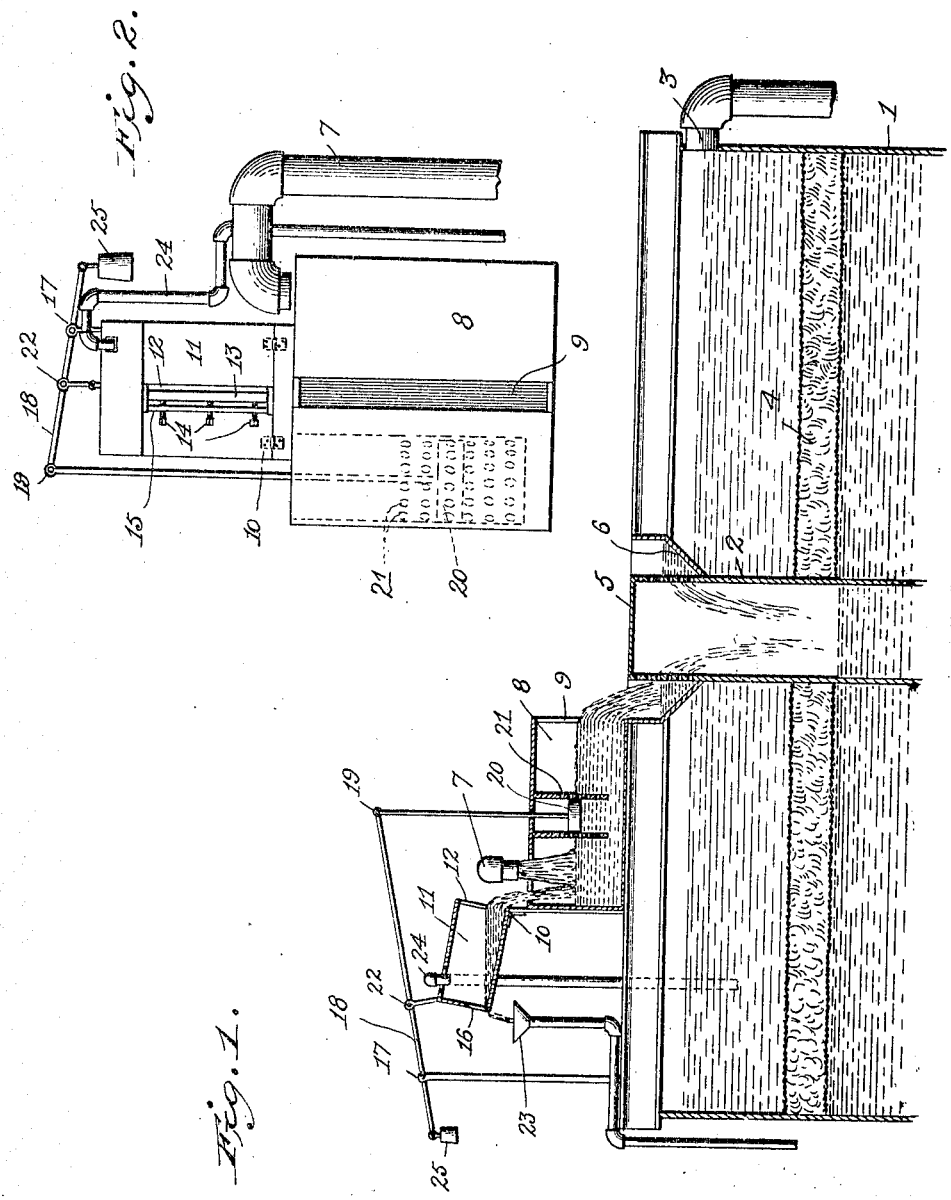
Witnesses
Edwin L. Jewell
Walter Allen
Inventor
Charles P. Van Gundy
By W. C. Schornborn
Attorney

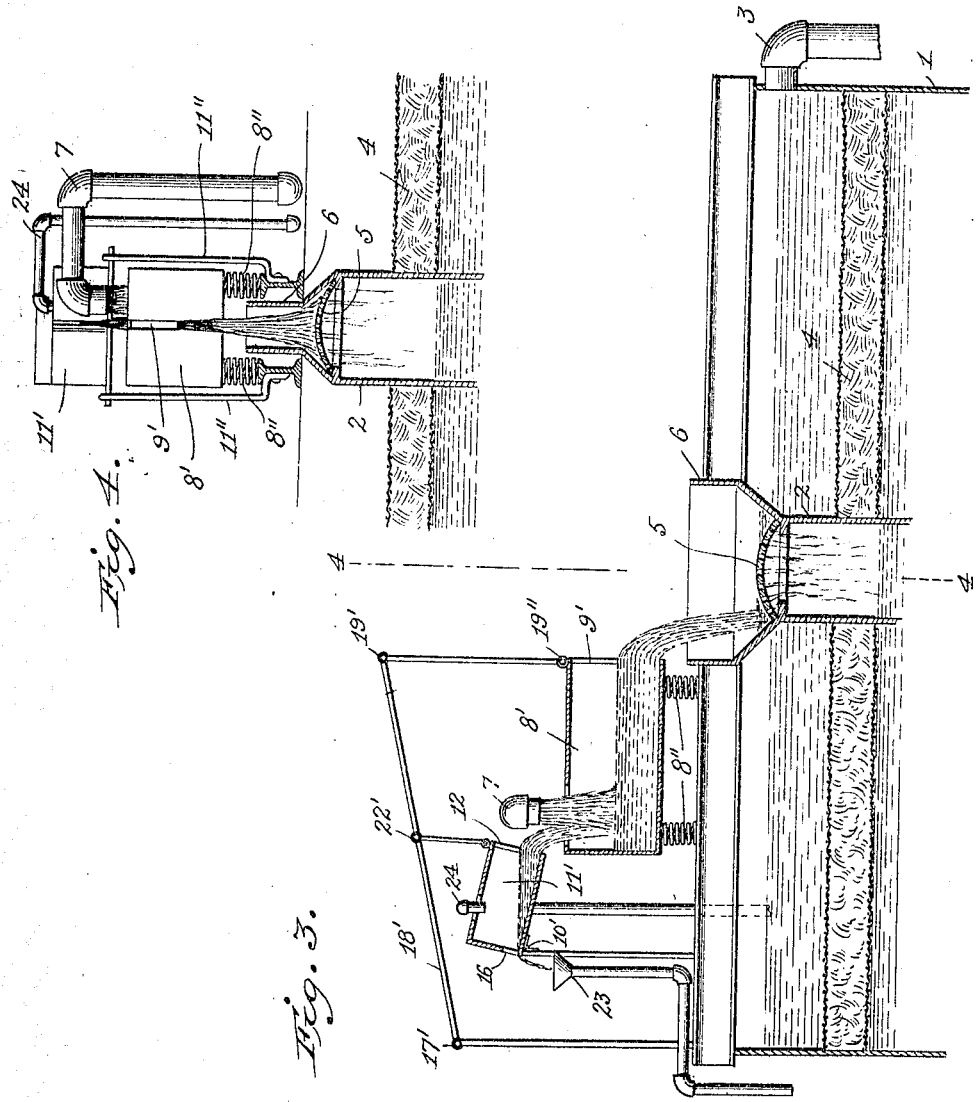

UNITED STATES PATENT OFFICE.

CHARLES P. VAN GUNDY, OF CATONSVILLE, MARYLAND.

WATER-PURIFYING APPARATUS.

No. 871,461.  Specification of Letters Patent.  Patented Nov. 19, 1907.

Application filed February 26, 1907. Serial No. 359,427.

*To all whom it may concern:*

Be it known that I, CHARLES P. VAN GUNDY, a citizen of the United States, residing at Catonsville, in the county of Baltimore and State of Maryland, have invented certain new and useful Improvements in Water-Purifying Apparatus, of which the following is a specification.

My invention relates to water purifying apparatus of the type wherein a determinate quantity of chemical is introduced into the water so that the impurities therein are precipitated or neutralized according to the result desired and chemicals used.

The invention consists in an improved device whereby the amount of chemical introduced is varied according to the variations in the water supply.

My invention will be understood from the following description taken in connection with the accompanying drawings in which similar reference characters indicate the same parts in the several figures of drawing and wherein:—

Figure 1, is a central vertical section showing my improved apparatus mounted on the top of a settling tank; Fig. 2, is an elevation showing the parts of the device on an enlarged scale; Fig. 3, is a central vertical section similar to Fig. 1, showing a modified form of the device, and Fig. 4, is a view on line 4—4 of Fig. 2.

1 designates a settling tank equipped in any suitable manner with flushing valves, filter and overflow and having in the present instance a central pipe 2 therein which may have suitable openings into the tank in the lower part thereof (not shown).

The tank 1 may have overflow 3 and a filter 4 of excelsior or the like. A suitable perforated baffle 5 and a conical funnel 6 may be provided at the top of said pipe 2 for the admission of water thereinto. The water supply pipe 7, delivers into a mixing box 8, mounted on top of the tank and having a suitable vertical outlet slot 9 adjacent to the funnel 6. Suitably pivoted at 10 above and adjacent to the mixing box 8 is a chemical box or holder 11. This box or holder has an opening or slot 12 adjacent the mixing box, the arrangement being such that upon the tilting of the holder 11, the contents thereof are emptied more or less rapidly, according to the amount of tilting, through the slot 12 into the mixing box 8. The slot 12 is preferably adjustable as to width; a preferred means for effecting such adjustment is to have an adjustable plate 13 adapted to have its position regulated by suitable backing screws 14 which screws may be threaded through a rib 15 on the box. Another opening or slot 16 is formed in the end of the box 11 opposite the slot 12 for a purpose hereinafter explained.

Pivoted at 17, upon a suitable standard is a lever 18, said lever having a pivoted connection 19 at its remote end to the rod of a float 20. Said float may be guided in a perforated cylinder 21 suitably arranged in the mixing box 8. The lever 18 has a connection at 22 with the box 11 at a point diagonally opposite the pivot 10 or approximately so. A chemical pipe 24 is arranged to deliver into the chemical box 11. By a forcing device (not shown) or other means a constant flow of chemical is fed through the pipe 24 somewhat in excess of what is normally required for treating the water as supplied by the pipe 7. A chemical return pipe 23, which may have a funnel at its top is arranged directly underneath the opening or slot 16.

The operation of the device will be readily understood from the foregoing description. When the pipe 7 delivers a larger quantity of water than usual, the water level in the mixing chamber 8 rises, thereby lifting the float 20. This float by the connections 19 and 22 thereof with the chemical box 11 will cause said box to be tilted to a greater extent, thus emptying a correspondingly larger proportion of the chemical therein into the box 8 and permitting a smaller proportion thereof to return by the opening or slot 16 and pipe 23. When the volume of water supplied by pipe 7 falls below normal the reverse operation takes place, the box 11 assuming more nearly a horizontal position, and hence a larger proportion of chemical will be discharged by slot 16 into the return pipe 23 and a smaller amount will be added to the water.

The opening or slot 12 in the chemical box 11 is preferably made adjustable in width as described so that a predetermined ratio between its volume of discharge and that of the opening or slot 9 in box 8 may be maintained, it being obvious that as the opening or slot 12 is widened a larger proportion of chemical will be introduced into a given volume of water.

The lever 18 may be provided with a suitable counter weight 25, if desired, to facilitate tilting of the box 11. The perforated cylinder 21 serves as a guide for the float 20, and also prevents too sudden fluctuations of the float by throttling the ingress of water thereto.

Figs. 3 and 4, illustrate a modified form of the device; the modified elements in these figures which correspond to those in the above description being designated by like numerals primed. In this modification the float 20 is dispensed with and the mixing box 8' itself is vertically movable, being mounted on springs 8''. The chemical box 11' is pivoted upon standards 11'' and is tilted in like manner as in the preceding case by lever 18' and connections 22', 19' and 19''. It will be apparent that when a larger quantity of water than normal is discharged the weight of the increased volume in box 8' will press down the spring 8'' and the box 11' will be correspondingly tilted to a greater degree and vice versa.

Applicant has in the present case shown, described and claimed the arrangement of mixing box having the float thereon and in which the chemical and water are mixed before passing into the receiving tank while, in applicant's companion case Serial No. 384,011, filed July 16, 1907, the invention claimed is not limited to this specific form and operation.

Having thus described my invention what I claim as new and desire to secure by Letters Patent is as follows:—

1. A water purifying apparatus comprising a mixing box, a discharge therefrom, variable according to the volume of water therein, a water supply thereto, a chemical supply, a movable chemical holder having a vertical slot therein, and connections to move said holder to vary the supply of chemical to said box according to the supply of water in said box.

2. A water purifying apparatus comprising a mixing box, a water supply thereto, a chemical supply, a movable chemical holder, said holder having a vertical slot, devices connected with said holder and arranged to be controlled by the supply of water in the box for varying the output of chemical to said box, and a return pipe adjacent said holder arranged to receive the excess of chemical.

3. A water purifying apparatus comprising a mixing box, having a variable discharge, a water supply thereto, a chemical supply, a tilting chemical holder having vertical slots therein at its opposite ends, one of said slots being adapted to deliver to said box and the other to a return pipe, and connections for tilting said holder variably according to the volume of water in said mixing box.

4. A water purifying apparatus comprising a mixing box, a vertical discharge slot therein, a water supply thereto, a chemical supply, a tilting chemical holder, vertical slots therein at the opposite ends, one of said slots being arranged to deliver into said box, means for adjusting the width of said latter slot and connections for variably tilting said holder according to the volume of water in the box.

5. A water purifying apparatus comprising a mixing box, a variable discharge therefrom, a water supply thereto, a chemical supply, a movable chemical holder, having a variable discharge into said box, a float in said box and connections between said float and said chemical holder to move the latter so as to discharge variable quantities of chemical according to the position of said float.

6. A water purifying apparatus comprising a mixing box, a water supply thereto, a chemical supply, a tilting chemical holder, having vertical slots at its opposite ends, one of said slots being arranged to discharge into said box and the other into a return pipe, a float in said box and connections from said float to said holder whereby the latter will be tilted variably according to the position of the float.

7. A water purifying apparatus comprising a mixing box, a vertical discharge slot therein, a water supply thereto, a chemical supply, a tilting chemical holder having vertical slots in its opposite ends, one of said slots being adjustable and arranged to empty into said box, a return pipe arranged to receive the discharge from the other of said slots, a float guided in said box, a pivoted lever connected to said float and to said holder and arranged to tilt the holder variably according to the vertical position of the float.

8. A water purifying apparatus comprising a mixing box, having a variable discharge, a water supply thereto, a chemical supply, a tilting chemical holder having openings therein at its opposite ends, one of said openings being adapted to deliver to said box and the other to a return pipe, and connections for tilting said holder variably according to the volume of water in said mixing box.

9. A water purifying apparatus comprising a mixing box, a vertical discharge slot therein, a water supply thereto, a chemical supply, a tilting chemical holder, openings therein at the opposite ends, one of said openings being arranged to deliver into said box, means for adjusting the width of said latter opening and connections for variably tilting said holder according to the volume of water in the box.

10. A water purifying apparatus comprising a mixing box, a water supply thereto, a chemical supply, a tilting chemical holder, having openings at its opposite ends, one of said openings being arranged to discharge into said box and the other into a return pipe, a float in said box and connections from said float to said holder whereby the latter will be tilted variably according to the position of the float.

11. A water purifying apparatus comprising a mixing box, a vertical discharge slot therein, a water supply thereto, a chemical supply, a tilting chemical holder having openings in its opposite ends, one of said openings being adjustable and arranged to empty into said box, a return pipe arranged to receive the discharge from the other of said openings, a float guided in said box, a pivoted lever connected to said float and to said holder and arranged to tilt the holder variably according to the vertical position of the float.

In testimony whereof I affix my signature in presence of two witnesses.

CHARLES P. VAN GUNDY.

Witnesses:
H. I. GARCELON,
R. R. STABLER.